March 6, 1973  J. A. STUDY  3,719,111
MARKING DEVICE FOR TORQUE APPLYING TOOL
Filed May 27, 1971  3 Sheets-Sheet 1

INVENTOR
JON A. STUDY
BY
*Hauke Gifford & Patalidis*
*Attorneys*

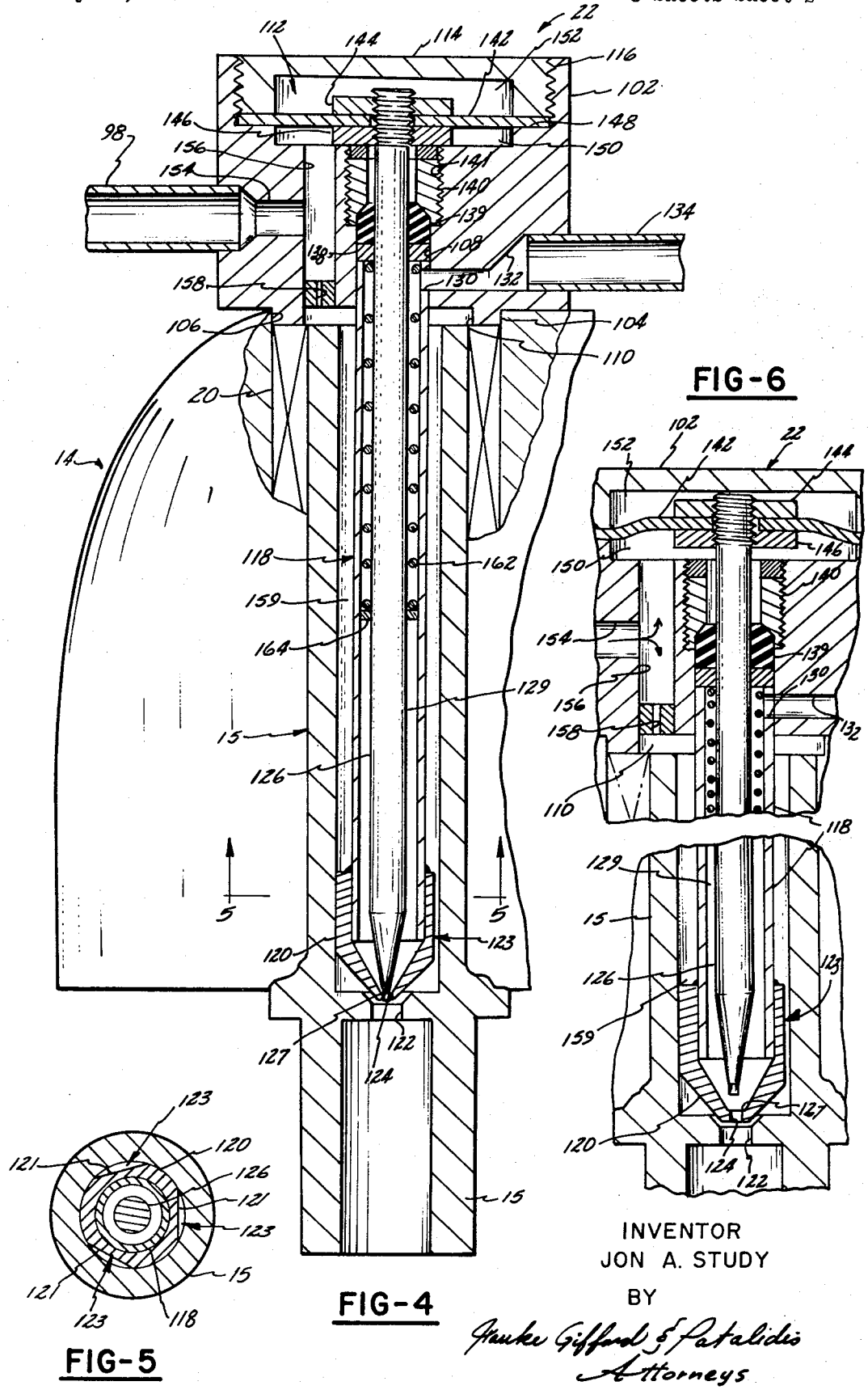

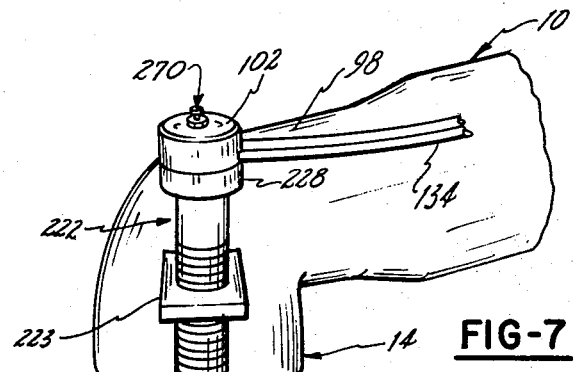
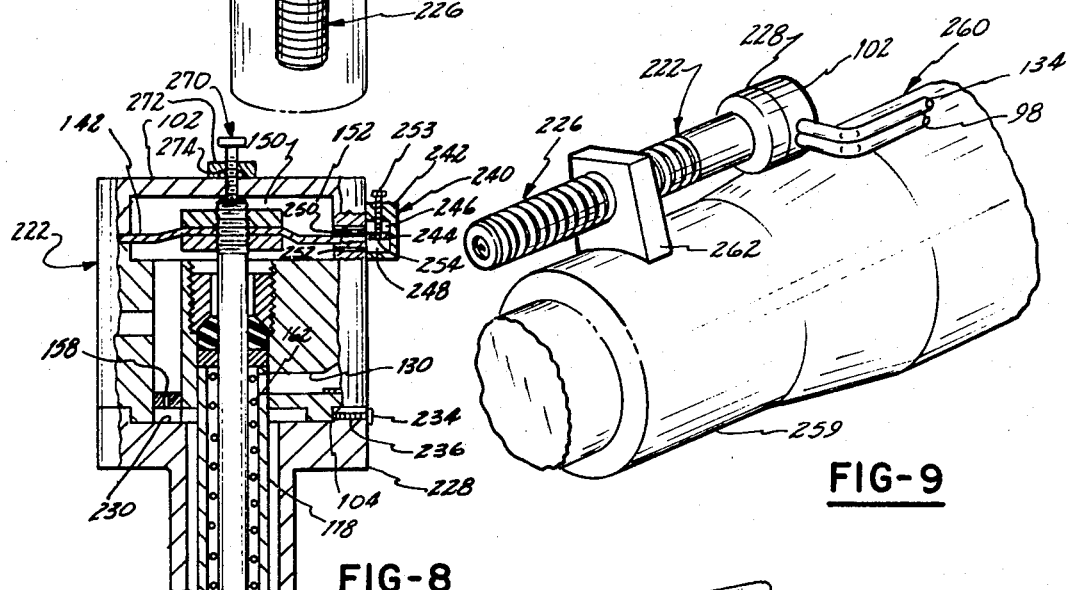
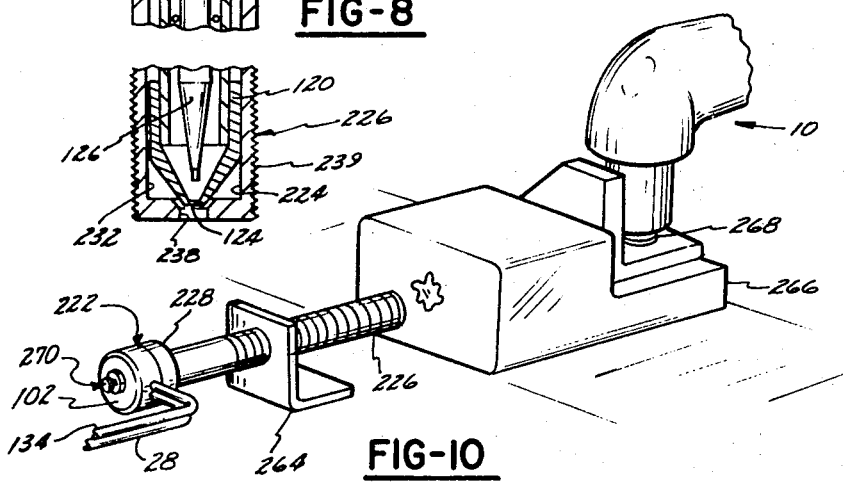

United States Patent Office 3,719,111
Patented Mar. 6, 1973

3,719,111
MARKING DEVICE FOR TORQUE
APPLYING TOOL
Jon A. Study, Grosse Pointe Woods, Mich., assignor to
Carco, Inc., Detroit, Mich.
Filed May 27, 1971, Ser. No. 147,455
Int. Cl. B25b
U.S. Cl. 81—52.5                                  10 Claims

ABSTRACT OF THE DISCLOSURE

A marketing device adapted to operate in conjunction with a tool of the type for applying a predetermined torque to a rotatable fastening member to mark the fastening member to indicate a completed application of the predetermined torque. The torque applying tool delivers the predetermined torque to the rotatable fastening member through a hollow rotatable work spindle which, in turn, is driven by a fluid motor. Suitable valving means are provided to selectively direct pressure fluid to the fluid motor to drive the same. The marking device comprises a valve member disposed in the hollow portion of the rotating spindle and responsive to a pressure fluid signal generated by the torque applying tool upon the completed application of the predetermined torque to eject a marking fluid onto the fastening member. In other embodiments of the invention the marking device is mounted on the exterior of the tool and at a position which is remote from the tool.

BACKGROUND OF THE INVENTION

(I) Field of the invention

The present invention relates to a tool for applying a predetermined torque to a rotatable fastening member and particularly to means for use in conjunction with such a tool to mark the fastening member to indicate the completed application of the predetermined torque.

(II) Description of the prior art

It is a recognized fact that to achieve a maximum efficiency for a bolt and nut assembly, the nut must be tightened down on the bolt or a threaded fastener engaged in a threaded bore to such an extent that predetermined minimum tension is exerted on the bolt or fastener shank. This minimum tension may be exceeded, but it must be reached for best results. One method which has been commonly employed to insure the attainment of the predetermined tension or preload of the bolt shank is a method which involves determining the torque which is required to achieve the desired tension, then once having determined the torque for a particular application, each nut is tightened to this particular torque.

Pneumatically operated tools, such as nut runners, are ideally suited for such application because the nut runners are designed to accurately and repetitively apply a predetermined torque to the nuts and then shut themselves off. In using nut runnners or the like for applying a predetermined torque to bolts, nuts and the like in mechanical assemblies, it is desirable to apply a mark to each bolt or nut which has been tightened so that an assembler and/or an inspector can thus ascertain whether any of the bolts or nuts have been missed, and thus save time by eliminating tightening or checking the bolts or nuts which have already been tightened to the proper torque. Typical prior art torque wrenches or nut runners apply a mark such as ink or paint simultaneously with the engagement of the bolt or nut. By this technique, however, the bolt may be improperly marked; that is, the bolt will be marked even if the tightening operation is interrupted prior to the completion of the proper torque. Thus, in such systems the desired result of marking the nut to indicate whether a certain torque has been applied is not achieved.

SUMMARY OF THE INVENTION

The present invention, which will be described subsequently in greater detail, comprises a marking device operable in conjunction with a tool of the type which delivers a predetermined torque to a rotatable fastening member, such as a bolt or nut, wherein the tool generates a signal, such as a fluid pressure, a pneumatic, a mechanical or an electric signal, which is indicative of the predetermined torque having been applied to the member, while the marking device in response to the signal marks the member with a suitable marking agent so that the mark is applied only upon the completed application of the predetermined torque to the fastening member.

It is therefore an object of the present invention to provide a marking device operable to mark a rotatable fastener after a predetermined torque has been applied to the fastener.

It is further an object of the present invention to provide a marking device which ejects a marking agent in response to a predetermined signal generated by a torque applying tool upon the application of a predetermined amount of torque.

Other objects, advantages, and applications of the present invention will become apparent to those skilled in the art of such marking devices when the accompanying description of several examples of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 4 is an enlarged fragmentary cross sectional view of the marking device taken along line 4—4 of FIG. 1;

FIG. 5 is a fragmentary cross sectional view of the marking device taken along line 5—5 of FIG. 4;

FIG. 6 is a fragmentary cross sectional view of a marking device similar to FIG. 4 but illustrating a different mode of operation;

FIG. 7 is a fragmentary perspective view of a modified marking device carried exteriorly of the nut runner illustrated in FIG. 1;

FIG. 8 is a fragmentary cross sectional view of the modified marking device illustrated in FIG. 7;

FIG. 9 is a fragmentary perspective view of the modified marking device illustrated in FIG. 8 with the marking device carried exteriorly of a pneumatic, in-line nut runner; and FIG. 10 is a fragmentary perspective view of the modified marking device shown in FIG. 8 and illustrated as being remotely mounted from the pneumatic nut runner.

DESCRIPTION OF THE PREFERRED EMBODIMENTS

Figure 1:
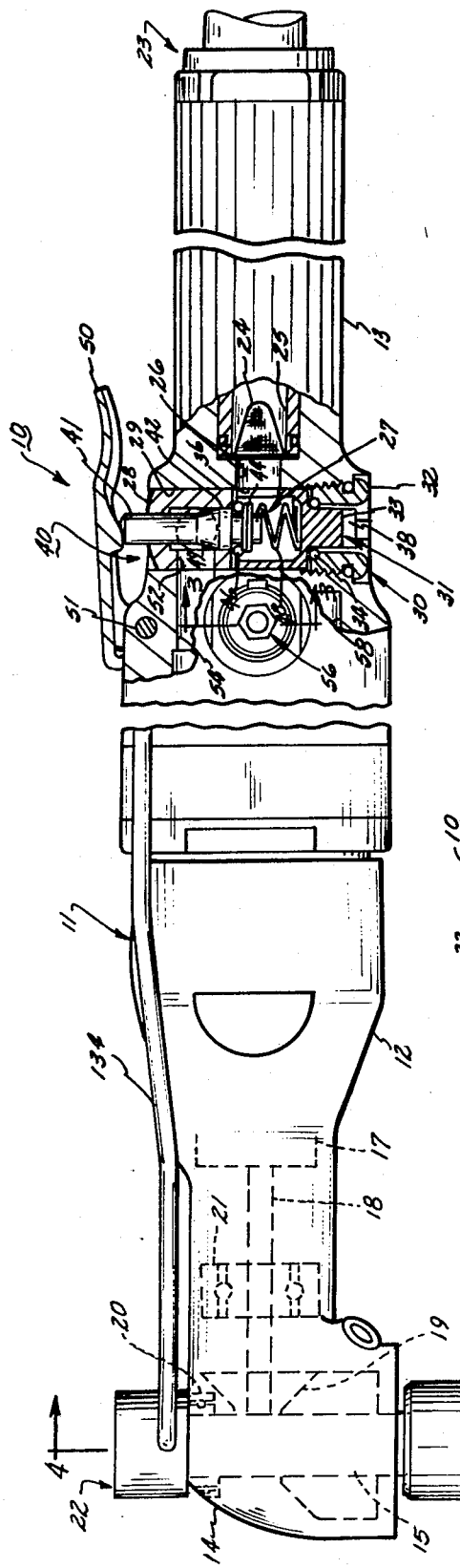
FIG. 1 is a partially sectioned side elevational view of a pneumatic, right angle nut runner having a marking device embodying the present invention.

Referring to the drawings, a power torque applying tool, such as a pneumatic, right angle nut runner 10, is shown in FIG. 1 as having an elongated cylindrical housing 11, including a motor portion 12, a handle portion 13 of a reduced diameter, and a front portion 14 carrying a rotating spindle 15 (FIGS. 1 and 4) of the type adapted to be connected to a conventional socket wrench 16 for driving nuts, bolts and the like. A fluid motor 17, which may be of any conventional type, such as a rotary vane air motor, is mounted in the motor portion 12 for driving the spindle 15 by means of a shaft 18 and a bevel gear arrangement 19. The shaft 18 and spindle 15 are both supported by suitable bearings, such as indicated by the numerals 20 and 21. A marking device 22, which will be described in greater detail hereinafter, is mounted on the front portion 14 of the nut runner 10.

Still referring to FIG. 1, compressed air for driving the fluid motor 17 is supplied through a fluid coupling 23 at the rear of the handle portion 13 and flows through a suitable inlet screen 24 disposed in a passageway 25, which in turn connects with a series of passages that lead to the fluid motor 17. An inlet passage 26 of the passageway 25 communicates with a double diameter valve chamber 27, defined by a bushing 28, fixed in one end of a bore 29 extending across housing 11, and by an air regulator 30 closing the other end of the bore 29. The air regulator 30 includes an inner cup-like member 31 forming an enlarged end of the valve chamber 27, and a shank portion 33 of a reduced diameter which in turn is received in a hollow plug 32 screwed into the bore 29. Member 31 is restrained against unintended movement by means of an O-ring 34 encircling the shank portion 33 and recessed on the inner end of the plug 32.

An inlet port 36, formed in the wall of member 31, serves to connect the inlet passage 26 and the chamber 27, while the volume of air admitted into the chamber 27 is governed by rotatably adjusting the position of the member 31 so as to vary the effective size of the inlet port 36, the adjustment being facilitated by a screwdriver slot 38 which is easily accessible at the outer end of the shank portion 33. Assuming a load of established value, the operator may thus vary the power of the motor 17 and the spindle speed to suit the particular application of the tool 10.

Still referring to FIG. 1, a throttle valve 40 is received in chamber 27 and has a stem 41 projecting out through the bushing 28, while an inner end of the throttle valve 40 is enlarged relative to the stem 41 and is further provided with an annular flange 44 on one side of which is mounted an annular seal 46, which in turn is engageable with the inner end of the bushing 28. The other side of the flange 44 is seated on a compression spring 48 that is biased between the flange 44 and member 31 so as to hold the throttle 40 in a normally closed position. The throttle valve 40 is provided with a graduated intermediate portion 49 which is tapered from the enlarged inner portion 42 of the throttle valve 40 to its end 41 for the purpose of effectively minimizing the initial pressure surge of air supplied to the motor 17.

To actuate the motor 17, a hand lever 50, pivotally supported on the housing 11 at 51 and engaging the outer projecting end of the stem 41, is compressed to unseat the throttle valve 40, whereupon air then enters chamber 27 through the inlet portion 36 to pass through an outlet port 52 in the bushing 28, communicating through an inlet passage 54 to a normally opened shut-off control valve 56 and therethrough to an outlet passage 58 to the motor 17.

Figure 3:
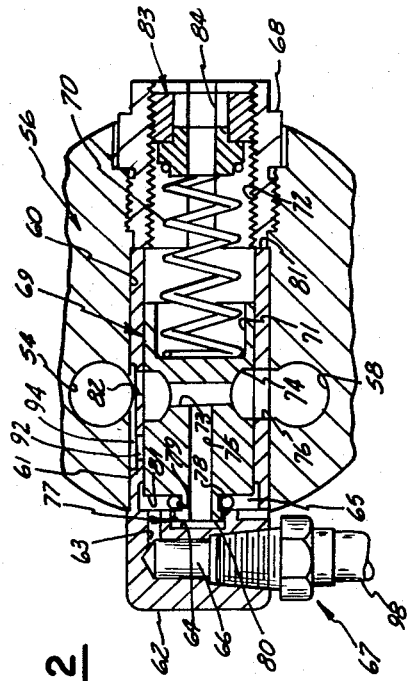
FIG. 3 is a fragmentary cross sectional view of the nut runner taken along line 3—3 of FIG. 1.
Figure 2:
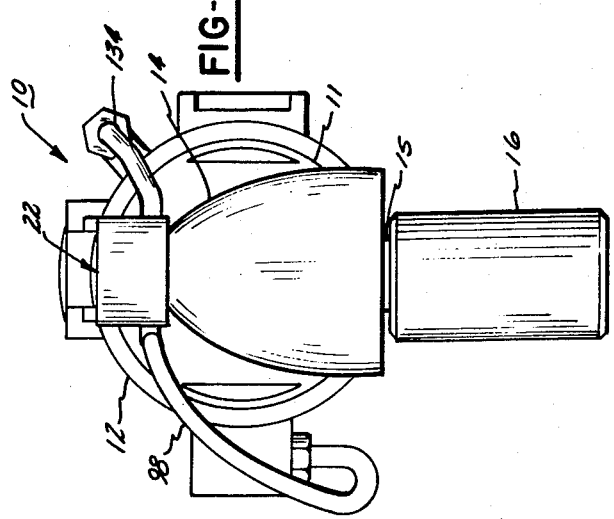
FIG. 2 is a plan front elevational view of the nut runner shown in FIG. 1.

Referring now to FIG. 3, a bore 60 is illustrated as extending across the housing 11 transversely to the bore 29 and receives a sleeve 61 having an end extension 62, including an outlet passage 63, disposed radially outwardly of a circular compartment 64, and adapted to connect a chamber 65 with an outlet 66, which in turn is suitably threaded to receive a fluid coupling, such as at 67. The sleeve 61 has an open inner end 81 abutting a coaxially aligned hollow plug 68 screwed into the opposite end of the bore 60. The sleeve 61 is rigidly fixed in position by any suitable means, such as by a press-fit.

For automatically shutting off air flow to the motor 17 upon a predetermined load being applied to the motor 17 to thus indicate that the desired torque has been achieved, a valve plunger or spool 69 is received in the chamber 65, defined by the inner surface of the sleeve 61, for reciprocating movement between open and closed positions respectively at the left and right ends of chamber 65 as viewed in FIG. 3. The end extension 62 of the sleeve 61 and the inner end of the plug 68 provide seats for the spool 69 in its open and closed positions respectively. The spool 69 is illustrated as being normally held open in its left hand position by a coil compression spring 70, having one end bearing against the bottom of a cup-shaped cavity 71 in the spool 69 and its opposite end being seated within a threaded bore 72 extending through the plug 68.

So that the spool 69 is responsive to variations in the motor operating pressure, which is a function of the output force of the motor 17 and thus an indication when a predetermined level of torque has been reached, passages in communication with the outlet passage 58 are provided for continually directing compressed air against the spool 69 to provide a force in opposition to the force of the spring 70 when the spool 69 is in an open position. More specifically, a passage 73 is shown as extending diametrically through a reduced intermediate portion 74 of the spool 69 and another passage 75 extends from the passage 73 axially through the left hand end of the spool, for instance as viewed in FIG. 3, to provide internal passage means of a generally T-shaped cross section. Passages 73 and 75 are in communication with an outlet port 76 in the sleeve 69, which connects to the outlet pasage 58 leading to the motor 17 so that air from the fitting 23 is supplied to the motor 17 when the spool 69 is in the open position.

The compartment 64 formed in the extension end 62 is of a circular cross section and is adapted to receive an annular extension 77 of a reduced diameter formed at the left end of the spool 69 and surrounding the axially extending passageway 75. The compartment 64 and the annular extension 77 are dimensioned to provide a preselected clearance between the spool 69 and the extension end 62 of the sleeve 61.

This clearance preferably is maintained by an O-ring 78 retained in a groove 79 around extension 77 to provide a tight fluid seal around compartment 64 when the spool 69 is in its open position. Thus, the end of the spool extension 77 provides a pressure sensing surface 80 which is in communication with the outlet passage 58 when the spool 69 is in its open position, the pressure sensing surface 80 being relatively small with respect to the annular end surface 81 of the spool 69 surrounding the extension 77.

To provide a torque control means which is highly sensitive to variations in the force imposed on the motor 17 and thus the torque achieved on the fastening member as indicated by change in the static pressure of the outlet passage 58, a drop in the air supply pressure at the inlet of the motor is intentionally created across the spool 69. For this purpose, a restrictive inlet port or orifice 82 is formed in the sleeve 61.

It will be apparent that for a given size air motor and a given minimum air supply pressure the torque at which shut-off of the valve 56 automatically takes place is determined by the force of the spring 70. To preset the shut-off torque at a desired maximum value, an adjustment plug 83 is provided for precisely varying the spring force exerted on the spool 69. The adjustment plug 83 has an aperture 84 which serves as a vent to release air trapped between the spool 69 and the plug 83 when the spool 69 is snapped into a closed position.

Upon reaching the preset shut-off torque, the pressure acting on the small pressure sensing surface 80 of the spool extension 77 within the compartment 64 reaches its adjusted maximum to overcome the atmospheric pressure and the force of spring 70, and the spool 69 will shift slightly to the right of the compartment 64 to unseat the O-ring 78, and then suddenly snaps to a closed position when the large end surface 81 of the spool 66 is exposed to the inlet pressure of the motor 17. This movement of the spool 65 shuts off air flow to the motor inlet and air is directed from the chamber 65 through a coupling tube 98 to actuate the marking device 22 housed in the front portion 14 of the housing 11.

Upon movement of the spool 69 into a shut-off position, air at supply pressure enters chamber 65 to the left of the spool 69 from the inlet passage 54 through a slot 94 and an orifice 92. By virtue of this construction, inlet air will be directed to the outlet 66 upon any movement of the spool 69 into a shut-off position, thereby sensing the condition of the nut runner 10, and automatically providing a fluid signal to the outlet 66, which signal is indicative of the predetermined torque having been applied to the fastening member.

Upon releasing the throttle lever 50, the valve 40 returns to a normally closed position, permitting the spool 69 to return to its normally open position in readiness for the next operating cycle.

It should be noted that the aforementioned description of the nut runner 10 is for purposes of illustration only and other mechanisms, which generate a pressure signal after a predetermined torque has been applied, may be used in conjunction with the present inventive marking device. It should be further noted that the signal generated by the nut runner 10 to actuate the marking device 22 may take other forms, as for example, mechanical or electrical signals may be used to actuate the marking device 22.

Referring now to FIGS. 4, 5 and 6, the marking device 22 is illustrated as comprising a head portion 102 having a lower annular projection 104 which is received in a complementary shaped opening 106 at the top of the front portion 14 of the housing 11 and retained therein by any suitable means, such as by press-fit, a set screw, a threaded engagement or the like. The head portion 102 has a centrally disposed bore 108 extending from a recess 110, defined by the internal surface of the annular projection 104, to an upper enlarged chamber 112 which, in turn, is enclosed by a cap member 114 that threadedly engages the upper end of the head 102 as shown at 116. The lower end of the bore 108 receives an elongated tubular member 118 which is retained therein by any suitable means, such as by a press-fit. The tubular member 118 extends downwardly from the head 102 into the interior of the spindle 15 in coaxial alignment therewith. The lower end of the tubular member 118, in turn, receives a nozzle member 120 having a rounded periphery with annularly spaced flats 121 (FIG. 5) which in conjunction with the inner wall of the spindle 15 define a plurality of passages 123. The rounded portion of the nozzle member 120 functions as a bearing surface and engages the inner wall of the spindle to axially align a nozzle orifice 124 formed in the lower portion of the nozzle member 120 with an ink orifice 122 formed in the upper portion of the socket engaging end of the spindle 15 through which a marking agent is adapted to be ejected for marking the fastening member after a predetermined torque has been imparted thereto.

A shut-off needle valve member 126, coaxially disposed within the tubular member 118, is movable between a first position wherein the valve member 126 is adapted to engage a valve seat 127 formed in the nozzle orifice 124 to close the nozzle orifice 124 as illustrated in FIG. 4, and to a second position wherein the valve member 126 is disengaged from the valve seat 127 to open the nozzle orifice 124 as illustrated in FIG. 6. The annular space between the interior wall of the tubular member 118 and the outer wall of shut-off needle valve member 126 defines an annular flow passageway 129 which communicates the nozzle orifice 124 with an inlet port 130 proximate the top of the tubular member 118.

The inlet port 130 is, in turn, in fluid communication through a passageway 132 with a marking agent supply line 134. The marking agent supply line 134 is connected to a marking agent reservoir (not shown) and is shown as being secured to the peripheral surface of the air inlet hose so as not to interfere with the movements of the tool operator. However, the supply line 134 may alternately be carried within the interior of the air inlet hose or remotely mounted therefrom.

The shut-off needle valve member 126 extends upwardly through the tubular member 118, a washer 138, a seal 139 preferably of a material such as tetrafluoroethylene, a seal retainer 140 and into the chamber 112. The seal 139 and washer 138 are securely held in position by a seal retainer 140 which threadably engages an enlarged portion 141 of the bore 108. A threaded upper end of the valve member 126 extends through a diaphragm member 142 that is sandwiched between upper and lower threaded fasteners 144 and 146 which, in turn, engage the upper threaded end of the valve member 126. The outer peripheral edge of the diaphragm 142 is held in a compressive fit against a shoulder 148 of the head portion 102 by the cover member 114. The diaphragm 142 thus separates the chamber 112 into two sub-chambers 150 and 152, the lower sub-chamber 150 being in communication with an air inlet port 154 through a passageway 156. The passageway 156 also communicates with the recess 110 through a restricted orifice 158. The annular space between the inner wall of the rotating spindle 15 and the outer wall of the tubular member 118 defines a second annular passageway 159 which communicates through passages 123 with the ink orifice 122 adjacent the nozzle orifice 124.

The inlet port 154 is connected to the extension end outlet 66 (FIG. 3) by means of the coupling tube 98 and thus, when a predetermined torque has been delivered to the spindle 15, as hereinbefore described, air pressure is exhausted through the extension end 62 and communicated to both the lower sub-chamber 150 and the annular passageway space 159 as long as the lever 50 is depressed.

A conventional compression coil spring 162 is disposed within the tubular member 118 around the shut-off needle valve member 126 with one end of the spring 162 bearing against a stop 164 carried by the needle valve member 126, while the other end of the spring 162 bears against the underside of the washer 138 such that the spring 162 normally biases the shut-off needle valve member 126 downwardly so that the lower end thereof engages the valve seat 127 formed in the nozzle orifice 124 to prevent the marking agent from passing therethrough. When air pressure is directed to the lower sub-chamber 150, the air pressure generates a force acting against the diaphragm member 142 to raise the shut-off needle valve member 126 upwardly against the bias of the spring 162 to open the nozzle orifice 124 as shown in FIG. 6 and to permit the marking agent to flow therethrough.

At the same time, a portion of the air will flow through the annular passageway 159 via the restricted orifice 158 to the ink orifice 122 to mix with and, more importantly, to carry the marking agent beyond the nozzle orifice 124 and to forcibly eject the marking agent through the ink orifice 122 and thereby mark the engaged fastening member. The restricted orifice 158 of course insures that there will be sufficient air pressure in the sub-chamber 150 to move the diaphragm.

It should also be noted that the clearance between the threaded upper end of the shut-off needle valve member 126 and the fastening members 144 and 146 is so sized as to permit the air in the sub-chamber 150 to bleed into the sub-chamber 152 after a predetermined period of time to balance the pressure on the opposite side of the diaphragm 142. When the differential pressure across the diaphragm 142 is sufficiently reduced, the spring 162 will lower the valve member 126 to close the nozzle orifice 124 and stop the flow of the marking agent even though the lever 50 is still depressed and air is still being directed from the shut-off valve 56 to the sub-chamber 150. This timed actuation of the valve member 126 is important to prevent continued operation of the device after the necessary mark has been made. It could, however, be accomplished by means different than those illustrated. An orifice could be provided through the diaphragm or, as will be described in greater detail hereinafter, a variable marking time may be provided by incorporating an adjustable bleed orifice for bleeding air from the sub-chamber 150 to the sub-chamber 152.

In operation, the nut runner 10 is actuated by depressing the lever 50, whereby pressurized air is communicated to the motor 17 which, in turn, drives the rotating spindle 15 to apply a predetermined amount of torque to a nut, bolt or the like. After the predetermined amount of torque has been applied, a pressure signal in the form of pressurized air is diverted to the outlet port 66 and communicated to the sub-chamber 150 through the coupling tube 98 and passageways 154 and 156. The pressurized air acts against the lower side of the diaphragm 142, causing the same to raise the shut-off needle valve member 126 away from the nozzle orifice 124 as illustrated in FIG. 6, thereby permitting the marking agent to flow from the reservoir through the coupling tube 134, into the annular passageway 129 between the inner wall of the tubular member 118 and the valve member 126, downwardly and externally of the tubular member 118 through the nozzle orifice 124. At the same time, a portion of the pressurized air will be directed through the restricted orifice 158 into the annular passageway 159 and downwardly in the form of an annular stream around the nozzle orifice 124, producing a suction to draw out and mix the marking agent released from the nozzle orifice 124 to forcibly carry the marking agent through the ink orifice 122 and externally of the marking device to mark the top surface of the engaged nut or bolt.

Shortly thereafter, a sufficient amount of air will have bled through the clearance between the threaded upper end of the valve member 126 and the retaining fasteners 144 and 146 to reduce the pressure differential on opposite sides of the diaphragm 142 until the biasing force of the compression spring 162 moves the valve member 126 downwardly to close off the flow of the marking agent through the nozzle orifice 124. Thus, even if the operator maintains the lever 50 depressed so that air continually flows into the sub-chamber 150, only a short burst of marking agent will be ejected from the marking device 22.

Referring now to FIGS. 7 and 8 of the drawings, a modification of the marking device 22 is illustrated in the form of a marking device 222 mounted to the front portion 14 of the nut runner 10 by means of a bracket 223 which, in turn, is fastened to the nut runner 10 by any suitable means, as for example set screws, welding or the like.

The marking device 222 comprises a head portion 102, a tubular member 118 and the other internal components hereinbefore described in the description of the marking device 22 illustrated in FIGS. 4, 5 and 6, and which components are designated by like reference numerals in FIG. 8, and thus a further detailed description thereof is not necessary.

The tubular member 118 extends downwardly in coaxial alignment through a bore 224 of a tubular stem member 226. Stem member 226 has an upper radially enlarged portion 228, the upper surface of which has a recess 230 having a diameter closely fitting the outer diameter of the lower annular projection 104 of the head portion 102. The stem member 226 is joined to the head portion 102 to form an annular space for communicating the pressurized air from the restricted passageway 158 to an annular passageway 232 formed between the inner wall of the tubular stem member 226 and the outer wall of the tubular member, the passageway 232 being functionally equivalent to the annular passageway 159 described hereinbefore in the description of the marking device 22 shown in FIG. 4.

The radially enlarged portion 228 is illustrated as being attached to the head portion 102 of the marking device 222 by a set screw 234 extending radially through a bore 236 and into engagement with the outer peripheral wall of the annular projection 104. However, it is to be understood that radially enlarged portion 228 may be attached to the annular projection 104 by any suitable means, such as having the engaging peripheral walls threaded or by means of a press-fit. The outer peripheral surface of the stem member 226 is threaded at 239 and provides a convenient means for attaching the marking device 222 to the bracket 223, such that an ink nozzle 238 at the lower end of the marking device 222 may be held at a selected distance from that portion of the article which is desired to be marked for indicating that a predetermined torque has been delivered to a fastening member engaging the article.

In the same manner as described hereinbefore, a rounded portion of the nozzle member 120 functions to axially align the nozzle orifice 124 of the tubular member 118 with the ink orifice 238 formed at the end of the tubular stem member 226 for ejecting a marking agent therethrough.

As indicated hereinbefore in the description of the embodiment of the marking device 22 illustrated in FIG. 4, an adjustable bleed orifice may be provided for bleeding air from the sub-chamber 150 to the sub-chamber 152. An adjustable bleed valve 240 for this purpose is illustrated in FIG. 8 as comprising a housing 242 with a partition 244 dividing the same into upper and lower chambers 246 and 248, which respectively communicate with the sub-chambers 152 and 150 through radial bores 250 and 252 located in the head portion 102. An adjustable valve member 253, threadably mounted through the housing 242, is adapted to engage a restricted orifice 254 extending through the partition 244 for metering a predetermined amount of air from the chamber 246 to chamber 248 and thus from sub-chamber 150 to sub-chamber 152 and thereby providing a means for selectively controlling the amount of time required for the air to bleed between the two sub-chambers to accommodate various types of applications in which the marking device of the present invention may be utilized. The restricted orifice 254 in the partition 244 is so sized as to permit the marking device 222 to be operative to eject a limited amount of the marking agent in the event the adjusting screw 253 should become separated from the valve 240. Thus, the restricted passage 254 is so sized as to allow a minimum quantity of the marking agent to be ejected from the marking device 222. By manipulating the adjusting screw 253 so as to further restrict the restricted orifice 254, the amount of the marking agent ejected from the marking device 222 will be increased as the increased restriction of the orifice 254 increases the time interval for balancing the pressure on the opposite sides of the diaphragm 142.

The amount of the marking agent ejected from the marking device 222 can be further controlled by a manually adjustable set screw 270 threadedly extending through the upper face of the head 102 and into the upper sub-chamber 152. The lower end of the set screw 270 is adapted to be engaged by the valve member 126 during upward movement thereof and by proper positioning of the set screw 270 the upward movement of the valve member and thus the size of the nozzle orifice 124 may be selectively controlled. The set screw 270 is shown in FIG. 8 as permitting a maximum upward displacement of valve member 126 and thus a maximum amount of the marking agent will be ejected through the nozzle orifice 124. By manually positioning the end of the set screw 270 further into the sub-chamber 152, the upward movement of the valve member 126 is decreased, as is the amount of the marking agent ejected from the marking device 222. A locking nut 272, having an O-ring seal 274, fixes the position of the set screw 270, while preventing any air leakage from sub-chamber 152.

Referring now to FIG. 9, there is illustrated another embodiment of the present invention wherein the marking device 222 is mounted to the front portion 259 of a pneumatic, in-line nut runner 260 by a bracket 262 which, in turn, is securely attached to the housing of the in-line nut runner 260 by any conventional fastening means, such as set screws, welding or the like. The marking device 222 illustrated in FIG. 9 is adapted to function in an identical manner as hereinbefore described with respect to the embodiments of the marking device illustrated in FIGS. 6 and 8, in that it is adapted to eject a predetermined amount of a marking agent upon a workpiece such as a bolt or other fastening member which has been tightened to a predetermined torque. The marking device 222 is actuated by a fluid signal generated by the nut runner 260 and as indicated hereinbefore such a signal may be in the form of a fluid pressure, an electrical or a mechanical signal.

Referring to FIG. 10, the marking device 222 is illustrated as being mounted by a bracket 264 adjacent a conveyor carrying the workpieces 266 into which fastening members 268 are threaded by the nut runner 10. The marking device 222, as illustrated in FIG. 10, is remotely mounted with respect to the nut runner 10 with the only connection between the nut runner 10 and the marking device 222 being the tube 98 which carries the pressure signal generated in response to a predetermined torque having been delivered by the nut runner 10 to the fastening member 268 carried by the workpiece.

In operation of the marking device 222, the nut runner 10 (or 260) is actuated by depressing the actuating lever 50, whereupon pressurized air is communicated to the operating motor of the nut runner to drive the spindle 15 to apply a predetermined amount of torque to the nut or bolt or other suitable fastener. After the predetermined amount of torque has been applied, a pressure signal in the form of pressurized air is communicated to the sub-chamber 150 through the coupling tube 98. Pressurized air acts against the lower side of the diaphragm 142, causing the same to raise the shut-off needle valve member 126 away from the nozzle orifice 124, thereby permitting the marking agent to flow from the reservoir through the coupling tube 134 and the passage 130 into the annular passageway formed between the inner wall of the tubular member and the valve member 126, downwardly and externally of the tubular member 118 and through the nozzle orifice 124.

At the same time, a portion of the pressurized air will be directed through the restricted orifice 158 into the annular passageway 232, downwardly in the form of an annular stream around the orifice nozzle 124, producing a suction effect to draw out and mix with the marking agent released from the nozzle orifice 124 so as to forcibly carry the marking agent through the ink orifice 238 and externally of the marking device 222 to mark the workpiece onto which the engaged nut or bolt has been fastened. After a sufficient amount of air bleeds from sub-chamber 150 through the adjusting valve 240 to the sub-chamber 152 to reduce the pressure differential on the opposite sides of the diaphragm 142, the biasing force of the compression spring 162 will move the valve member 126 downwardly to close off the flow of the marking agent through the nozzle orifice 124. Thus, in the same manner as described hereinbefore with respect to the embodiment disclosed in FIG. 6, the marking agent will be ejected from the marking device 222 for only a limited predetermined period of time.

It can thus be seen that the present invention has provided a marking device for automatically placing a marking agent on a rotatable fastening member or its associated workpiece for indicating the completed application of a preselected torque to the fastening member.

What is claimed is as follows:

1. A torque applying tool comprising:
a housing;
a work spindle rotatably mounted in said housing and adapted to engage a rotatable fastening member and deliver torque thereto;
a motor operatively coupled to said spindle for rotating same;
means for driving said motor for delivering a predetermined torque to said spindle and thus to said fastening member;
means for providing a signal indicative of said predetermined torque having been delivered;
a tubular member mounted in said work spindle, said tubular member having an opening proximate the fastening member engaging portion of said spindle;
means communicating the interior of said tubular member to a source of marking agent, said tubular member being adapted to eject said marking agent through said opening;
means movably mounted in said tubular member between a first position closing said opening to prevent said marking agent from being ejected therethrough, and a second position opening said opening to permit said marking agent to be ejected therethrough;
means operatively coupled to said movably mounted means and adapted to move said last mentioned means to said second position in response to said signal; and
means communicating said signal to said operatively coupled means to move said movably mounted means to said second position whereby said engaged fastening member is marked with said marking agent when said predetermined torque has been delivered to said fastening member.

2. A torque applying tool comprising:
a housing;
a hollow work spindle rotatably mounted in said housing and adapted to engage a rotatable fastening member and deliver a torque thereto;
a fluid motor operatively coupled to said spindle for rotating same;
pressure fluid means for driving said fluid motor for delivery of a predetermined torque to said spindle and thus said fastening member;
means for providing a pressure fluid signal indicative of said predetermined torque having been delivered;
a tubular member mounted in said hollow work spindle, said tubular member having an opening proximate the fastening member engaging portion of said spindle;
means communicating the interior of said tubular member to a source of a marking agent, said tubular member being adapted to eject said marking agent through said opening;
means movably mounted in said tubular member between a first position closing said opening to prevent said marking fluid from being ejected therethrough, and a second position opening said opening to permit said marking agent to be ejected therethrough;
pressure responsive means operatively coupled to said movably mounted means and adapted to move said last mentioned means to said second position when subjected to pressure; and
means communicating said pressure fluid signal to said pressure responsive means and said tubular member, said pressure fluid being mixed with said marking agent to forcibly eject said marking agent from said spindle when said movably mounted means is moved to said second position in response to said fluid pressure signal, whereby said engaged fastening member is marked with said marking agent when said predetermined torque has been delivered.

3. The torque applying tool defined in claim 2, further comprising means normally biasing said movably mounted means to said first position.

4. The torque applying tool defined in claim 2, further comprising passage means in said housing for communicating said pressure fluid signal between the interior of said work spindle and the exterior of said tubular member such that said pressure fluid means is directed toward said opening and joins with said marking fluid beyond said tubular member opening.

5. The torque applying tool is claim 2 wherein said movably mounted means comprises a valve member axially movable in said tubular member, a portion of said valve member engaging said tubular member opening to close said opening when said valve member is in said first position.

6. The torque applying tool defined in claim 5, further comprising means normally biasing said valve member to said first position.

7. The torque applying tool defined in claim 2 wherein said pressure responsive means comprises a chamber; a movable member disposed in said chamber and dividing said chamber into said first and second sub-chambers, said pressure fluid signal communicating with said first sub-chamber, said movable member being operatively coupled to said movably mounted means and adapted to move said movably mounted means to said second position when said pressure fluid signal is communicated to said first sub-chamber.

8. The torque applying tool defined in claim 7, further comprising restricted passage means fluidly connecting said first sub-chamber to said second sub-chamber, the pressure in said second sub-chamber acting against said movable member to move said movably mounted means to said first position, said movably mounted means being moved to said second position when said pressure fluid signal is communicated to said first sub-chamber, and means normally biasing said movably mounted means to said first position such that said movably mounted means is moved to said first position when the pressure differential between said sub-chambers reduces to a predetermined value.

9. A marking device for ejecting a marking agent said marking device comprising:
a housing;
a tubular member supported by said housing, said tubular member having an opening at one end adapted to eject said marking agent;
means communicating the interior of said tubular member to a source of said marking agent;
means movably mounted in said tubular member between a first position for closing said opening to prevent said marking agent from being ejected therethrough, and a second position opening said opening to permit said marking agent to be ejected therethrough;
pressure responsive means operatively coupled to said movably mounted means and adapted to move said movably mounted means to said second position when subjected to pressure;
a source of pressure fluid; and
passage means in said housing communicating with said pressure responsive means and said movably mounted means for selectively connecting said source of pressure fluid to said passage means whereby said pressure fluid joins said marking agent to carry said marking fluid from said device as said movably mounted means moves to said second position in response to said fluid pressure;
said passage means comprising a hollow work spindle of a torque applying tool,
said work spindle being rotatably mounted within said torque applying tool and being adapted to engage a rotatable fastening member being disposed within said hollow work spindle and forming an annular space thereinbetween for communicating said pressure fluid to said tubular opening.

10 The marking device as defined in claim 2 further comprising means for selectively controlling the movement of said movably mounted means for controlling the amount said opening is opened whereby the amount of said marking agent ejected through said opening is controlled.

References Cited

UNITED STATES PATENTS

| | | | |
|---|---|---|---|
| 3,009,371 | 11/1961 | Hines et al. | 81—53 R |
| 3,523,471 | 8/1970 | Lance | 81—52.5 |

JAMES L. JONES, JR., Primary Examiner